US012621557B2

(12) United States Patent
Youn et al.

(10) Patent No.: US 12,621,557 B2
(45) Date of Patent: May 5, 2026

(54) ELECTRONIC DEVICE AND METHOD FOR DISPLAYING IMAGE BASED ON INTERACTION

(71) Applicant: SAMSUNG ELECTRONICS CO., LTD., Suwon-si (KR)

(72) Inventors: Sungwook Youn, Suwon-si (KR); Yanggeun Oh, Suwon-si (KR); Byungjun Son, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 304 days.

(21) Appl. No.: 18/144,132

(22) Filed: May 5, 2023

(65) Prior Publication Data

US 2024/0040234 A1 Feb. 1, 2024

Related U.S. Application Data

(63) Continuation of application No. PCT/KR2023/005714, filed on Apr. 26, 2023.

(30) Foreign Application Priority Data

Jul. 29, 2022 (KR) ........................ 10-2022-0094519
Aug. 26, 2022 (KR) ........................ 10-2022-0107935

(51) Int. Cl.
H04N 23/63 (2023.01)
G06T 7/70 (2017.01)
G06V 10/25 (2022.01)

(52) U.S. Cl.
CPC ............. *H04N 23/632* (2023.01); *G06T 7/70* (2017.01); *G06V 10/25* (2022.01); *G06T 2207/20104* (2013.01); *G06V 2201/07* (2022.01)

(58) Field of Classification Search
CPC .................................................. H04N 23/632
See application file for complete search history.

(56) References Cited

U.S. PATENT DOCUMENTS 8,670,046 B2 * 3/2014 Ohba ................... H04N 9/8205
                                              348/240.99
10,769,834 B2 9/2020 Mckaskle et al.
(Continued)

FOREIGN PATENT DOCUMENTS

EP 3937480 A1 1/2022
EP 4096218 A1 11/2022
(Continued)

OTHER PUBLICATIONS

International Search Report and Written Opinion for International Application No. PCT/KR2023/005714; International Filing Date Apr. 26, 2023; Date of Mailing Jul. 26, 2023, 2022; 12 Pages.
(Continued)

*Primary Examiner* — Cynthia Segura
(74) *Attorney, Agent, or Firm* — CANTOR COLBURN LLP

(57) ABSTRACT

An electronic device receives a shooting input while displaying a preview image based on at least a portion of images obtained through a camera having a first field-of-view (FoV). The electronic device obtains a video of the first FoV through the camera, in response to the shooting input. The electronic device identifies a visual object included in the preview image, while obtaining the video. The electronic device displays the preview image, based on a second FoV that includes the visual object, and is included in the first FoV, in response to an input indicating selection of the visual object. The electronic device obtains meta data indicating reproduction of the video based on the second FoV corresponding to the input, among the first FoV and the second
(Continued)

RECEIVE SHOOTING INPUT WHILE DISPLAYING PREVIEW IMAGE — 901

OBTAIN VIDEO OF FIRST FOV THROUGH CAMERA — 903

IDENTIFY VISUAL OBJECT INCLUDED IN PREVIEW IMAGE — 905

DISPLAY PREVIEW IMAGE BASED ON SECOND FOV INCLUDING VISUAL OBJECT AND INCLUDED WITHIN FIRST FOV, IN RESPONSE TO INPUT INDICATING THAT VISUAL OBJECT IS SELECTED — 907

OBTAIN METADATA INDICATING THAT VIDEO IS REPRODUCED BASED ON SECOND FOV CORRESPONDING TO INPUT, ASSOCIATED WITH VIDEO OBTAINED BASED ON FIRST FOV — 909

FoV, where the meta data is associated with the video obtained based on the first FoV.

20 Claims, 11 Drawing Sheets

(56) References Cited

U.S. PATENT DOCUMENTS

| 10,819,911 | B2 | 10/2020 | Ryu et al. |
| 10,893,202 | B2 | 1/2021 | Badr et al. |
| 10,902,057 | B2 | 1/2021 | Kato |
| 10,911,663 | B2 | 2/2021 | Sato |
| 11,350,026 | B1 | 5/2022 | Manzari et al. |
| 11,350,033 | B2 | 5/2022 | An et al. |
| 2009/0103835 | A1 | 4/2009 | Folgner et al. |
| 2012/0256964 | A1* | 10/2012 | Hirota .................... G06V 40/16 345/666 |
| 2016/0027476 | A1* | 1/2016 | Shimokawa ........... H04N 23/63 386/241 |
| 2018/0227506 | A1* | 8/2018 | Lee ...................... H04N 5/2624 |
| 2020/0019213 | A1 | 1/2020 | Lee |
| 2021/0073549 | A1 | 3/2021 | Desai et al. |
| 2023/0188845 | A1 | 6/2023 | Youn et al. |
| 2023/0353863 | A1 | 11/2023 | Jeon et al. |
| 2024/0126425 | A1 | 4/2024 | King et al. |
| 2024/0259670 | A1 | 8/2024 | Manzari et al. |

FOREIGN PATENT DOCUMENTS

| JP | 2004133536 | A | 4/2004 |
| JP | 2008172485 | A | 7/2008 |
| JP | 2011114401 | A | 6/2011 |
| JP | 2019074928 | A | 5/2019 |
| KR | 100991583 | B1 | 11/2010 |
| KR | 101850158 | B1 | 4/2018 |
| KR | 20190014638 | A | 2/2019 |
| KR | 20210101009 | A | 8/2021 |
| KR | 20220017298 | A | 2/2022 |
| KR | 102397968 | B1 | 5/2022 |
| KR | 20220076253 | A | 6/2022 |
| KR | 102419513 | B1 | 7/2022 |
| KR | 20220102491 | A | 7/2022 |
| KR | 102514612 | B1 | 3/2023 |
| KR | 102593824 | B1 | 10/2023 |

OTHER PUBLICATIONS

European Search Report corresponding to Application No. 23846747.6; Dated May 12, 2025.

* cited by examiner

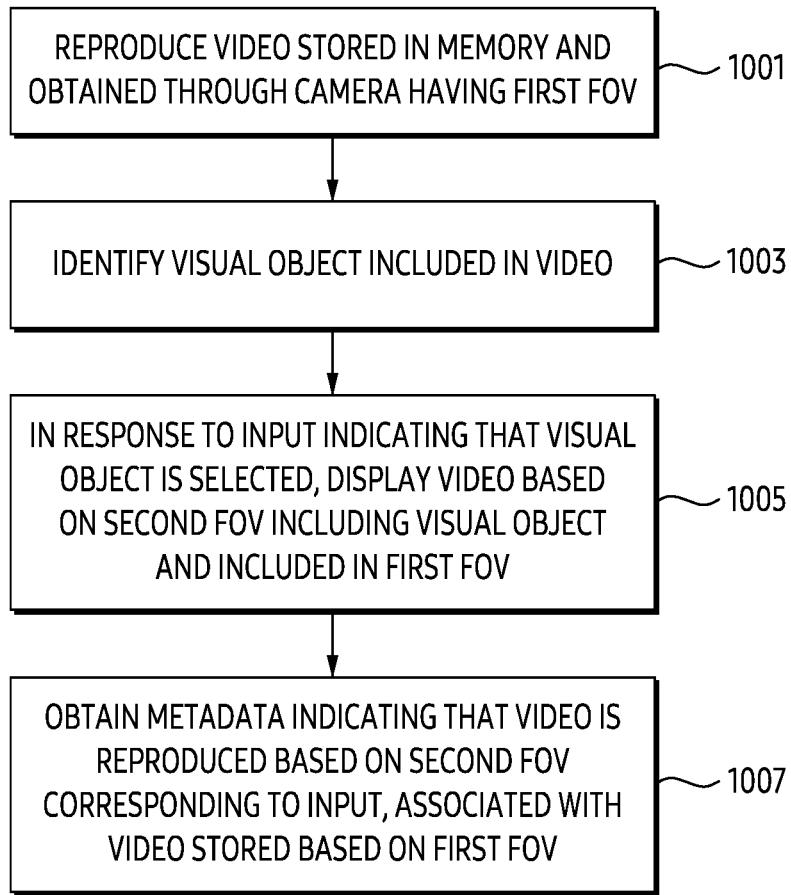

REPRODUCE VIDEO STORED IN MEMORY AND OBTAINED THROUGH CAMERA HAVING FIRST FOV — 1001

IDENTIFY VISUAL OBJECT INCLUDED IN VIDEO — 1003

IN RESPONSE TO INPUT INDICATING THAT VISUAL OBJECT IS SELECTED, DISPLAY VIDEO BASED ON SECOND FOV INCLUDING VISUAL OBJECT AND INCLUDED IN FIRST FOV — 1005

OBTAIN METADATA INDICATING THAT VIDEO IS REPRODUCED BASED ON SECOND FOV CORRESPONDING TO INPUT, ASSOCIATED WITH VIDEO STORED BASED ON FIRST FOV — 1007

FIG. 10

ELECTRONIC DEVICE AND METHOD FOR DISPLAYING IMAGE BASED ON INTERACTION

CROSS-REFERENCE TO RELATED APPLICATION(S)

This application is a continuation application, claiming priority under § 365(c), of International Application No. PCT/KR2023/005714, filed on Apr. 26, 2023, which is based on and claims the benefit of Korean patent application number 10-2022-0107935 filed on Aug. 26, 2022, in the Korean Intellectual Property Office and of Korean patent application number 10-2022-0094519 filed on Jul. 29, 2022, in the Korean Intellectual Property Office, the disclosures of which are incorporated by reference herein in their entireties.

BACKGROUND

Technical Field

Various embodiments relate to an electronic device and a method for displaying an image based on interaction.

Description of Related Art

An electronic device may obtain a plurality of images through a camera. The electronic device may enlarge or reduce the images while displaying the plurality of obtained images on a screen.

SUMMARY

According to an embodiment, an electronic device may comprise a display, a camera, and a processor. The processor may receive a shooting input while displaying a preview image based on at least a portion of images obtained through the camera having a first field-of-view (FoV). The processor may obtain a video of the first FoV through the camera, in response to the shooting input. The processor may identify a visual object included in the preview image, while obtaining the video. The processor may display the preview image, based on a second FoV that is including the visual object, and is included in the first FoV, in response to an input indicating selection of the visual object. The processor may obtain meta data indicating reproduction of the video based on the second FoV corresponding to the input, among the first FoV and the second FoV, wherein the meta data is associated with the video obtained based on the first FoV.

According to an embodiment, an electronic device may comprise a display, a camera, a memory, and a processor. The processor may reproduce a video stored in the memory, obtained through the camera having a first field-of view (FoV). The processor may identify a visual object included in the video, while reproducing the video. The processor may display the video, based on a second FoV that is including the visual object and is included in the first FoV, in response to an input indicating selection of the visual object. The processor may obtain meta data indicating reproduction of the video based on the second FoV corresponding to the input, among the first FoV and the second FoV, wherein the meta data is associated with the video stored based on the first FoV.

According to an embodiment, a method of an electronic device may comprise receiving a shooting input, while displaying a preview image based on at least a portion of images obtained through the camera having a first field-of-view (FoV). The method of the electronic device may include obtaining a video of the first FoV through the camera, in response to the shooting input. The method of the electronic device may include identifying a visual object included in the preview image, while obtaining the video. The method of the electronic device may include displaying the preview image, based on a second FoV that is including the visual object, and is included in the first FoV, in response to an input indicating selection of the visual object. The method of the electronic device may include obtaining meta data indicating reproduction of the video based on the second FoV corresponding to the input, among the first FoV and the second FoV, wherein the meta data is associated with the video obtained based on the first FoV.

According to an embodiment, a method of an electronic device may comprise reproducing a video stored in the memory, obtained through the camera having a first field-of view (FoV). The method of the electronic device may include identifying a visual object included in the video, while reproducing the video. The method of the electronic device may include displaying the video, based on a second FoV that is including the visual object and is included in the first FoV, in response to an input indicating selection of the visual object. The method of the electronic device may include obtaining meta data indicating reproduction of the video based on the second FoV corresponding to the input, among the first FoV and the second FoV, wherein the meta data is associated with the video stored based on the first FoV.

BRIEF DESCRIPTION OF THE DRAWINGS

FIG. 10 is an example of a flowchart of an operation of an electronic device according to an embodiment.

DETAILED DESCRIPTION

Figure 1:
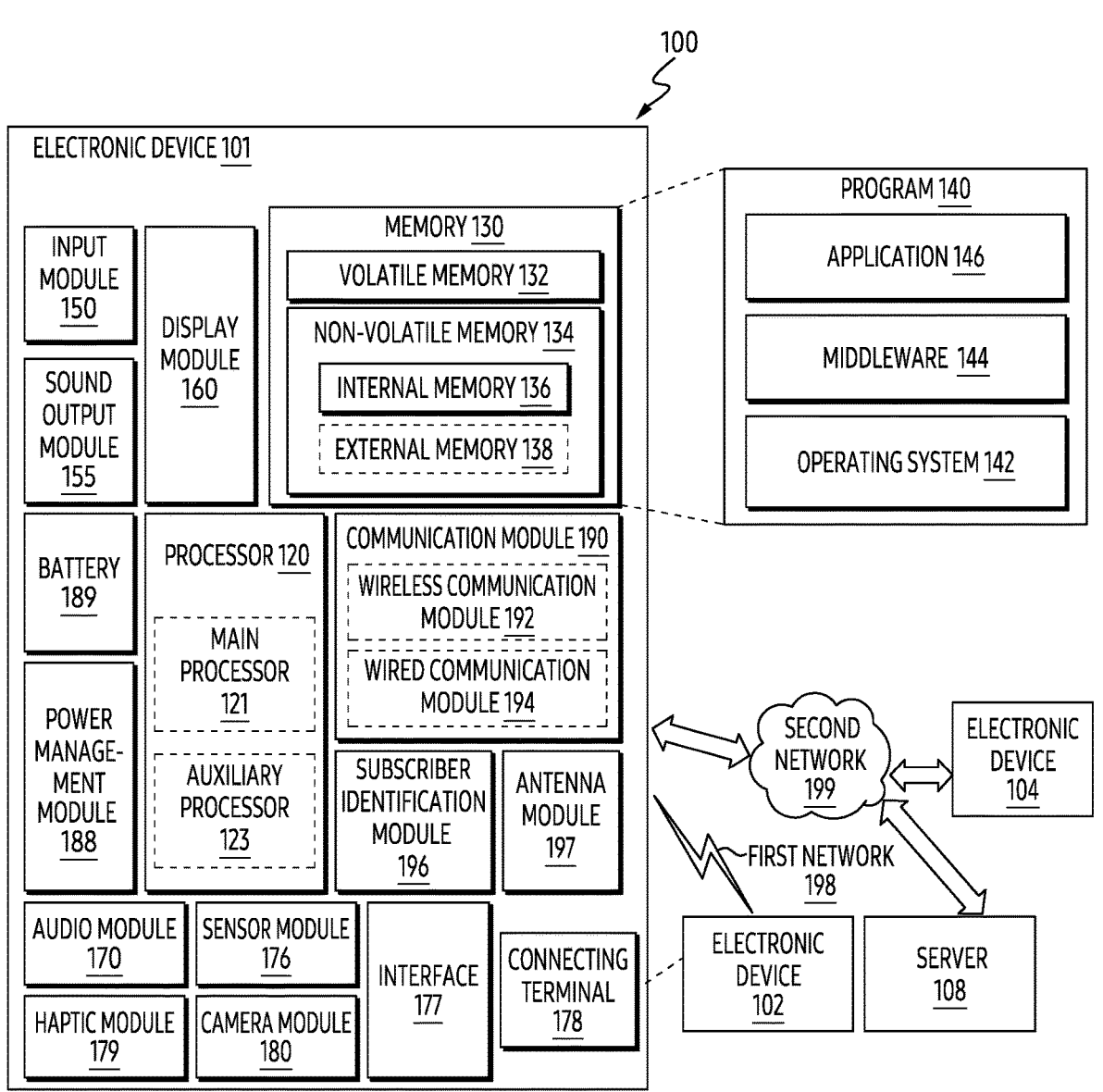
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above or below.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. The term "equivalent" can mean equal to, corresponding to, or substantially similar. For instance, text may be considered equivalent with different capitalization, spelling variations, synonyms, punctuation variations, and the like.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
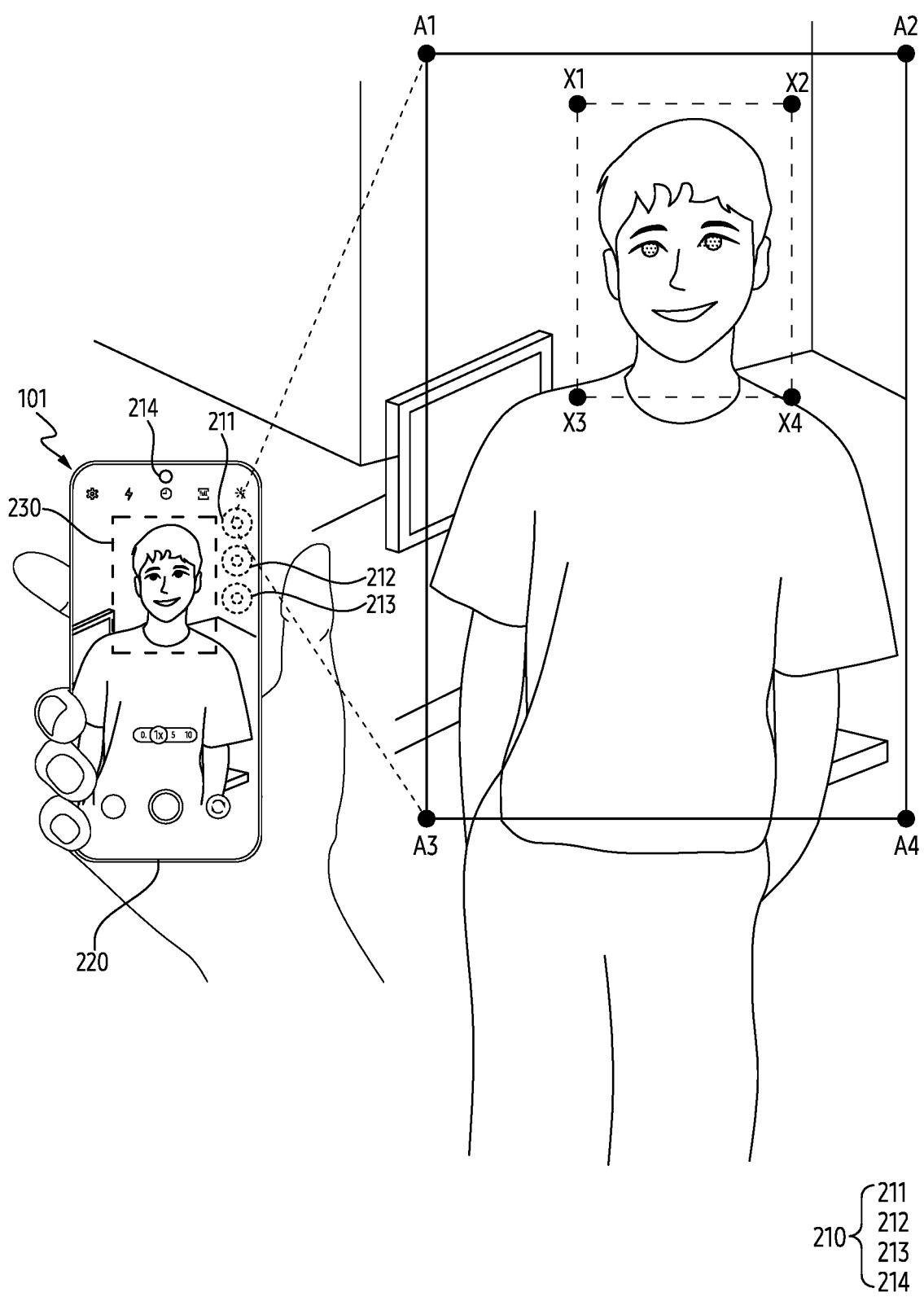
FIG. 2 is an example of an electronic device for obtaining a video according to an embodiment.

FIG. 2 is an example of an electronic device for obtaining a video according to an embodiment. The electronic device 101 of FIG. 2 may be an example of the electronic device 101 of FIG. 1.

Referring to FIG. 2, the electronic device 101 may include a camera 210 (e.g., the camera module 180 of FIG. 1) and/or a display 220 (e.g., the display module 160 of FIG. 1). For example, the camera 210 may include a first camera 211 to a fourth camera 214. For example, the first camera 211 to a third camera 213 may have different angles of view. For example, the first camera 211 may have the smallest angle of view among the angles of view of the first camera 211 to the third camera 213. For example, the first camera 211 may have a first field-of-view (FoV). The first camera 211 may be referred to as a telecamera, in terms of the angle of view. The third camera 213 may have the widest angle of view among the angles of view of the first camera 211 to the third camera 213. The third camera 213 may be referred to as an ultra-wide-angle camera, in terms of the angle of view. The second camera 212 may have an angle of view wider than the angle of view of the first camera 211 and narrower than the angle of view of the third camera 213. For example, the second camera 212 may have a second FoV including the first FoV. For example, the third camera 213 may have a third FoV. The third FoV may include the second FoV. The second camera 212 may be referred to as a wide camera in terms of the angle of view. For example, the electronic device 101 may display a video obtained based on the smaller FoV on the screen in the display 220 while obtaining a video based on the camera 210 having a larger FoV. The electronic device 101 may include a fourth camera 214. The fourth camera 214 may be disposed to obtain an image in a direction viewed by the display 220. However, it is not limited thereto. For example, an angle of view may include the entire image obtained based on a lens of the camera 210. For example, the FoV may be at least a part of an image obtained based on the camera 210.

According to an embodiment, the electronic device 101 may obtain a video based on the camera 210. The video may be a set of images obtained based on the camera 210. For example, the video may be displayed on a screen of the display 220 based on a plurality of frames. For example, the electronic device 101 may display an image obtained based on the camera 210 on a screen. The image obtained based on the camera 210 may include vertices A1, A2, A3, and A4. For example, the electronic device 101 may display a preview image including vertices A1, A2, A3, and A4 on the screen. For example, vertices of a designated area in which the preview image is displayed in display 220 may match each of the vertices A1, A2, A3, and A4 of the preview image.

According to an embodiment, the electronic device 101 may enlarge and display points X1, X2, X3, and X4 in the preview image different from the vertices A1, A2, A3, and A4 of the preview image, in response to an input indicating that a portion 230 in the preview image (e.g., a portion in which a visual object corresponding to an external object is displayed) is tracked. For example, the electronic device 101 may display the portion 230 of the preview image having points X1, X2, X3, and X4 in the display 220 as vertices while obtaining a video including vertices A1, A2, A3, and A4. For example, the vertices of the designated area in display 220 may match each of the points X1, X2, X3, and X4 of the portion 230. For example, the electronic device 101 may display a preview image excluding vertices A1, A2, A3, and A4 and including points X1, X2, X3, and X4 on the screen while obtaining a video including vertices A1, A2, A3, and A4. An example of displaying a preview image including points X1, X2, X3, and X4 among vertices A1, A2, A3, and A4 and points X1, X2, X3, and X4 on the screen will be described later in FIGS. 5A to 5B.

According to an embodiment, while obtaining a video based on the camera 210, the electronic device 101 may display the video obtained based on the camera 210 on the screen of the display 220 as a preview image. According to an embodiment, while obtaining the preview image, the electronic device 101 may crop and display at least a portion of the preview image. For example, the electronic device 101 may identify a visual object (e.g., subject). For example, the electronic device 101 may display an area for indicating that the visual object is identified in the preview image, based on the identification of the visual object. For example, the area for indicating that the visual object is identified may be referred to as a square including the visual object. For example, the area for indicating that the visual object is identified may be referred to as a region of interest (ROI). The area for indicating that the visual object is identified may include points X1, X2, X3, and X4. For example, as the electronic device 101 performs cropping of the preview image, vertices A1, A2, A3, and A4 may be excluded from the display area, and points X1, X2, X3, and X4 may be included in the screen. According to an embodiment, the electronic device 101 may store data on an area to be displayed as a preview image while displaying the cropped image as a preview image. Data on the area displayed as a preview image may include metadata. The operation of identifying the visual object and displaying the cropped image on the screen will be described later with reference to FIGS. 5A to 5B.

According to an embodiment, an electronic device 101 may receive an input indicating that a visual object in the preview image is selected. For example, an input indicating the selection of a visual object may include a gesture indicating the selection of a visual object displayed in the preview image, a touch input on the visual object, and/or a touch input using an external electronic device (e.g., a stylus pen). For example, the input to the visual object may include a gesture designating an area for identifying the visual object. For example, the gesture designating an area for identifying the visual object may include a gesture in which the user of the electronic device 101 inputs a figure (e.g., a closed curve such as a square and/or a circle) including the visual object on the display 220. The gesture designating an area for identifying the visual object may include a hovering gesture. For example, the electronic device 101 may receive a hovering gesture designating an area surrounding the visual object. For example, the hovering gesture designating an area surrounding the visual object may include designating an area including the visual object. However, it is not limited thereto.

According to an embodiment, the electronic device 101 may crop the visual object and display the visual object on a screen of the display 220 based on an input indicating that the visual object is selected. For example, cropping a visual object and displaying the visual object on the screen of display 220 may include a zoom-in on the visual object and displaying it on the screen. According to an embodiment, the electronic device 101 may include panning around the visual object based on the input to the visual object. For example, panning may include locating the visual object in the center of the screen and tracking it. For example, panning may be an operation of tracking a visual object by locating the intersection of a line segment connecting a point X1 and a point X4, and a line segment connecting a point X2 and a point X3 at the center of the screen.

According to an embodiment, the electronic device 101 may obtain an image based on the first camera 211 and the second camera 212. For example, the first camera 211 may have a first FoV. For example, the electronic device 101 may obtain images through the first camera 211 having the first FoV. The electronic device 101 may obtain images based on the second camera 212. For example, the second camera 212 may have a second FoV. For example, the electronic device 101 may obtain images through the second camera 212 having the second FoV. The electronic device 101 may display a preview image based on at least a portion of the images obtained through the second camera 212. The electronic device 101 may receive a shooting input while displaying the preview image. The electronic device 101 may obtain the video in response to the shooting input. For example, the video may include images obtained through camera 210. For example, the video may sequentially display the obtained images on the screen. Displaying the obtained images sequentially on the screen may include designating a frame number in the order in which the images are displayed on the screen and displaying the images on the screen.

According to an embodiment, the electronic device 101 may identify a visual object included in the preview image while obtaining the preview image. The visual object may correspond to a subject captured by the camera 210. For example, the electronic device 101 may identify a subject commonly included in images obtained through the camera 210. The electronic device 101 may track a position of the subject in each of the images. The electronic device 101 may receive an input indicating that the visual object is selected. The electronic device 101 may obtain the video based on the second FoV using the second camera 212, based on the input. In a state of obtaining the video based on the second FoV, the electronic device 101 may obtain another video based on the first FoV and including a visual object selected by the input, through the first camera 211. For example, in a state that a video based on the first FoV based on the first camera 211 is displayed as a preview image, the electronic device 101 may store metadata indicating that the video is reproduced based on the first FoV based on the first camera 211. The metadata may be included in the video obtained based on the second camera 212.

As described above, according to an embodiment, the electronic device 101 may store metadata obtained based on the first FoV in the video obtained based on the second FoV. For example, the electronic device 101 may enhance the user experience by using and reproducing the metadata obtained based on the first FoV in the video obtained based on the second FoV.

Figure 3:
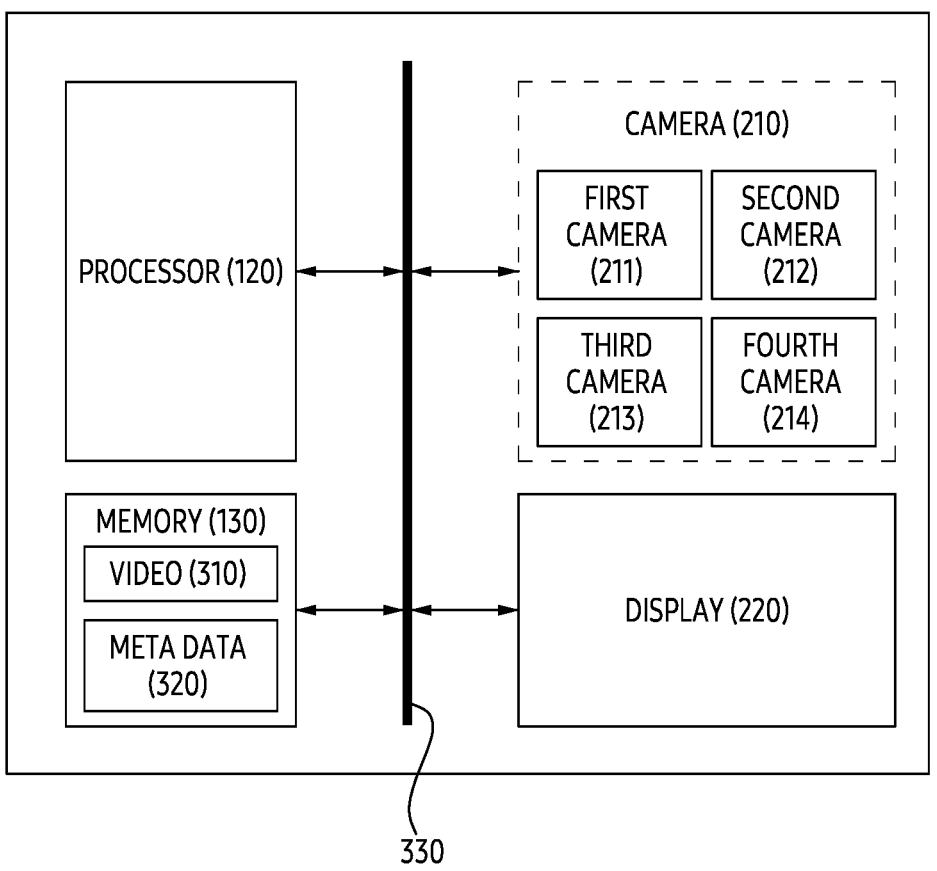
FIG. 3 is an example of a block diagram of an electronic device according to an embodiment.

FIG. 3 is an example of a block diagram of an electronic device according to an embodiment. The electronic device 101 of FIG. 3 may be an example of the electronic device 101 of FIGS. 1 to 2.

Referring to FIG. 3, the electronic device 101 according to an embodiment may include at least one of a processor 120, a memory 130, a camera 210, and a display 220. The processor 120, the memory 130, the camera 210, and the display 220 may be electrically and/or operably coupled with each other by an electronic component such as a communication bus 330. Although illustrated based on different blocks, the embodiment is not limited thereto. For example, a part (e.g., the processor 120, the memory 130, the camera 210, and/or the display 220) of the hardware component illustrated in FIG. 3 may be included in a single integrated circuit, such as a system on a chip (SoC). The type and/or number of the hardware component included in the electronic device 101 is not limited as illustrated in FIG. 3. For example, the electronic device 101 may include only a part of the hardware component illustrated in FIG. 3. The processor 120, the memory 130, the camera 210, and/or the display 220 are illustrated in a single number, but may be a plurality.

According to an embodiment, the processor 120 of the electronic device 101 may correspond to at least a part of the processor 120 of FIG. 1. According to an embodiment, the processor 120 may include a hardware component for processing data based on one or more instructions. For example, the hardware component for processing data may include an arithmetic and logic unit (ALU), a floating point unit (FPU), a field programmable gate array (FPGA), an application processor (AP) and a micro-computer (Micom), and/or a central processing unit (CPU). The number of the processors 120 may be one or more. For example, the processor 120 may have a structure of a multi-core processor such as a dual core, a quad core, or a hexa core. For example, processor 120 may have a structure of a single core processor such as a single core.

According to an embodiment, the camera 210 may include cameras having different angle of view (or FoV). For example, the electronic device 101 may include a first camera 211, a second camera 212, a third camera 213, and/or a fourth camera 214. For example, the electronic device 101 may include at least one of the first camera 211, the second camera 212, the third camera 213, and the fourth camera 214. For example, the camera 210 may include the first camera 211, the second camera 212, the third camera 213, and/or the fourth camera 214. For example, the processor 120 may obtain an image through the camera 210. The processor 120 may display a preview image in the screen of the display 220, based on at least a part of the images obtained through the camera 210.

According to an embodiment, the processor 120 may obtain images through a camera having a first FoV. For example, the processor 120 may display a preview image based on at least a part of the images. For example, the processor 120 may receive a shooting input while displaying the preview image. For example, the shooting input may include an input to a button displayed in the display 220. The input to the button displayed in the display 220 may include a gesture of pressing the displayed button. For example, an input to the button displayed on the display 220 may include an input of pressing the button beyond a designated time (e.g., 1 second). For example, the shooting input may include an input to a button exposed to the outside of electronic device 101. For example, the processor 120 may obtain a video 310 of the first FoV through the camera 210 in response to receiving the input to the button.

According to an embodiment, the processor 120 may identify a visual object included in the preview image while obtaining the video 310 of the first FoV. For example, the visual object may be included in a region of interest (ROI). For example, a visual object included in the preview image may include a subject. For example, the subject may include a person, an animal, and/or an object. According to an embodiment, the processor 120 may receive an input for a visual object. For example, the input for the visual object may include an input for the region of interest. For example, the processor 120 may display a preview image based on the second FoV in response to an input indicating that a visual object is selected. For example, the second FoV may be included in the first FoV. For example, the preview image displayed based on the second FoV may include a visual object. For example, the processor 120 may independently store an input indicating that the visual object is selected. For example, the processor 120 may store the frame number in which the visual object is selected and/or the position of the visual object, within the frames of the video 310.

According to an embodiment, the processor 120 may obtain metadata 320 indicating that the video 310 is reproduced based on the second FoV corresponding to the input among the first FoV and the second FoV, associated with the video 310 obtained based on the first FoV. For example, the metadata 320 may include at least one of an identifier assigned to the visual object, a position of the second FoV within the first FoV, or a size. For example, the metadata 320 may be stored in a file indicating the video 310. For example, the metadata 320 may be stored in the memory 130 independent of the video 310. Description related to the metadata 320 will be described later in FIG. 6.

According to an embodiment, the processor 120 may execute the video 310 including the metadata 320. When executing the video 310, the processor 120 may reproduce the video 310 based on the metadata 320. For example, the processor 120 may reproduce the metadata 320 based on the second FoV included in the video 310 obtained based on the first FoV. For example, the processor 120 may reproduce the video using the metadata 320 based on the second FoV included in the video 310 obtained based on the first FoV. For example, the processor 120 may reproduce the video 310 in which the visual object is enlarged based on the second FoV. For example, the processor 120 may display the region of interest in the display 220 while reproducing the video 310 including the metadata 320.

According to an embodiment, the processor 120 may revise the preview image of the second FoV while displaying the preview image based on the second FoV. For example, the revision of the preview image may include a resize and/or image improvement. For example, the resize may include revising the preview image to match the resolution of the electronic device 101. For example, the image improvement may include removing noise from the preview image. For example, the image improvement may include contrasting and adjusting the preview image. For example, the image improvement may include an operation that compensates for deterioration of image quality due to upscaling.

According to an embodiment, the processor 120 may reproduce the video 310 based on an interpolation algorithm. For example, when reproducing the video 310 using the interpolation algorithm, the processor 120 may more densely revise between frames included in the video 310. For example, the electronic device 101 may enhance the user experience by providing the revised video 310 to the user.

According to an embodiment, the processor 120 may store the video 310 obtained based on the first FoV in the memory 130. For example, the processor 120 may process images (e.g., images indicating each of frames of the video 310) included in the memory 130 stored in the memory, in a stable state of the electronic device 101. The stable state may include a state in which the interaction between the electronic device 101 and the user does not occur for a designated time (e.g., 30 minutes). The image processing performed in the stable state may include an operation of recognizing a subject from the video 310 stored in the electronic device 101. The operation of recognizing the subject may include obtaining the position of the visual object corresponding to the subject in each of the frames in the video 310. For example, the processor 120 may obtain information on the images. For example, the information may include information on identifiers of one or more visual objects included in the images, positions of the one or more visual objects, and/or whether the user interacts with the one or more visual objects. For example, the processor 120 may designate a region of interest including the visual object within a state in which the visual object is identified. For example, the processor 120 may designate an identifier of the visual object. For example, the processor 120 may store the information within the memory 130 as the metadata 320. For example, the processor 120 may store the zoomed-in metadata 320 for the visual object based on designating the identifier of the visual object and/or the region of interest.

As described above, according to an embodiment, the electronic device 101 may identify a visual object in the stable state. For example, the electronic device 101 may designate a region of interest within the stable state. For example, the electronic device 10 may enhance the user experience of the electronic device 101 by enlarging the visual object included in the region of interest and displaying it on the screen of the display 220, while executing the video 310 designated by the region of interest.

Figure 4:
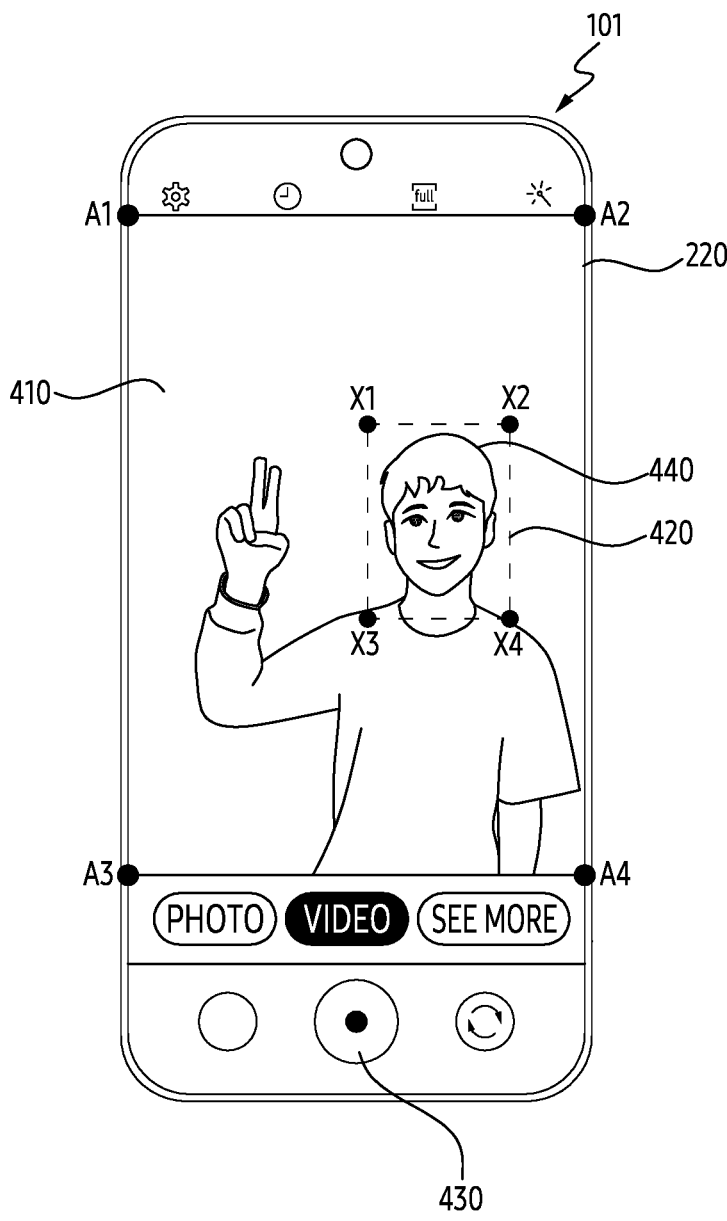
FIG. 4 is an example of an operation user interface (UI) of a camera for obtaining a video of an electronic device, according to an embodiment.

FIG. 4 is an example of an operation user interface (UI) of a camera for obtaining a video of an electronic device, according to an embodiment. The electronic device 101 of FIG. 4 may be an example of the electronic device 101 of FIGS. 1 to 3. The display 220 of FIG. 4 may be an example of the display 220 of FIGS. 2 and 3.

Referring to FIG. 4, according to an embodiment, the electronic device 101 may obtain images based on a camera (e.g., the camera 210 of FIG. 3) having a first FoV. The electronic device 101 may display the obtained images on the screen 410 of the display 220. The electronic device 101 may display a preview image based on at least a part of the obtained images. The electronic device 101 may receive a shooting input while displaying the preview image. For example, an input to a button 430 may include the shooting input. For example, the input to button 430 may include a gesture of pressing the button 430. For example, the input to button 430 may include a gesture of touching the button 430. For example, the input to the button 430 may include a gesture of pressing the button 430 for a designated time or more.

According to an embodiment, in response to the shooting input, the electronic device 101 may obtain a video (e.g., the video 310 of FIG. 3) of the first FoV through the camera. For example, the video of the first FoV may be a video including vertices A1, A2, A3, and A4 illustrated in FIG. 4. According to an embodiment, the electronic device 101 may identify the visual object 440 in a video including the vertices A1, A2, A3, and A4. The electronic device 101 may receive an input indicating that the visual object 440 is selected based on identifying the visual object 440. The input indicating that the visual object 440 is selected may include a gesture for pressing the visual object 440. The input indicating that the visual object 440 is selected may include a touch input on the visual object 440. The input indicating that the visual object 440 is selected may include a gesture maintaining a touch on the visual object 440 for a designated time. The electronic device 101 may display an area 420 for indicating that the visual object 440 is selected based on an input indicating that the visual object 440 is selected. For example, the electronic device 101 may display an area 420 for indicating that the visual object 440 is selected on the screen 410 of the display 220.

As described above, according to an embodiment, the electronic device 101 may assist the user in confirming that the visual object 440 is selected by displaying the area 420 for indicating that the visual object 440 is selected in the screen 410 of the display 220.

Figure 5A:
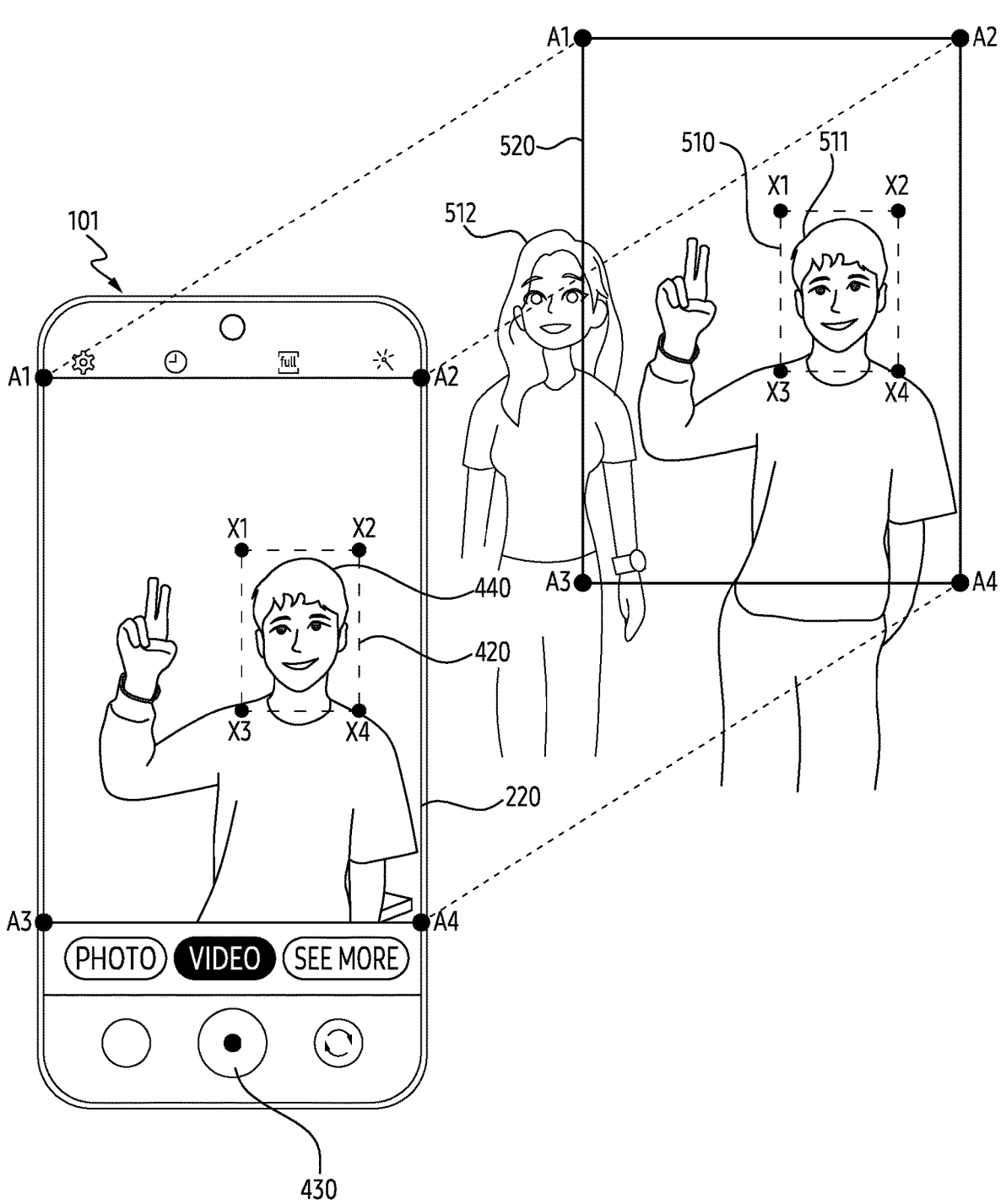
FIGS. 5A to 5B are examples of a state of an electronic device displayed while obtaining a video, according to an embodiment.
Figure 5B:
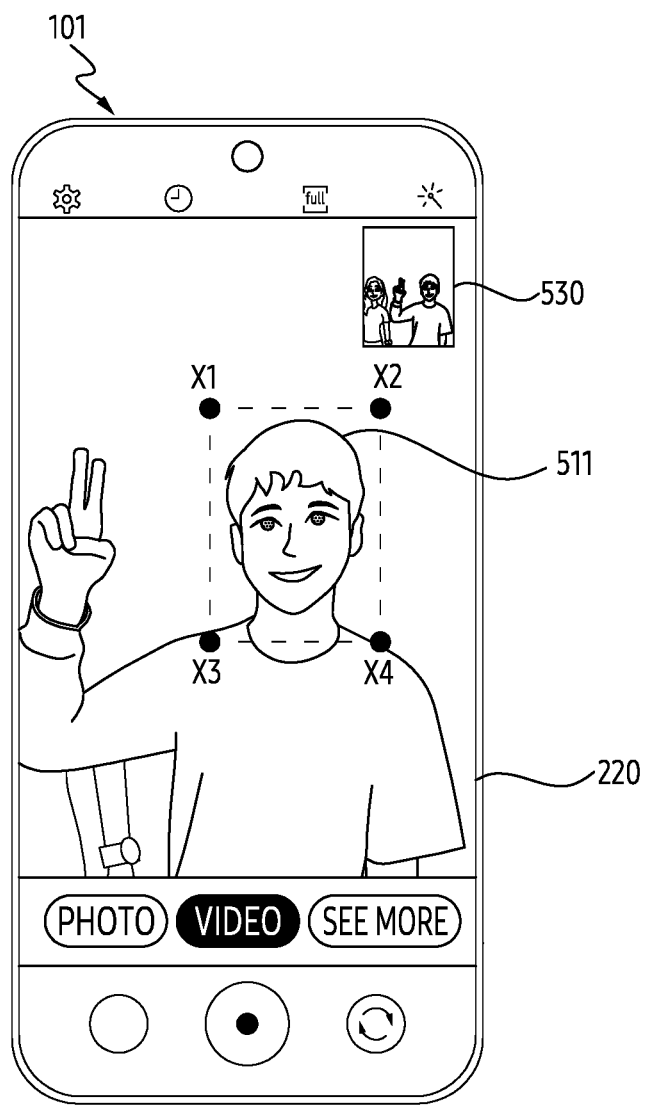

FIGS. 5A to 5B are examples of a state of an electronic device displayed while obtaining a video, according to an embodiment. The electronic device 101 of FIGS. 5A to 5B may be an example of the electronic device 101 of FIGS. 1 to 4.

Referring to FIGS. SA to 5B, the electronic device 101 may display images obtained based on the camera (e.g., the camera 210 of FIG. 2) on the screen. For example, the electronic device 101 may display a preview image on the screen based on at least a part of the images obtained based on the camera. While displaying the preview image on the screen, the electronic device 101 may obtain a video (e.g., the video 310 of FIG. 3) based on an input to the button 430. The video may include images obtained based on the camera.

Referring to FIG. 5A, the electronic device 101 may obtain images based on a camera having a first FoV. For example, the electronic device 101 may obtain images including vertices A1, A2, A3, and A4 based on the camera having the first FoV. For example, the electronic device 101 may identify visual objects 511 and 512 within an area 520 including vertices A1, A2, A3, and A4. The electronic device 101 may visually emphasize at least one of the visual objects 511 and 512. For example, the electronic device 101 may display images focused on at least one of the visual objects 511 and 512 on the screen. For example, the vertices A1, A2, A3, and A4 may be excluded from the display area of the screen, and points X1, X2, X3, and X4 of an area 510 may be displayed on the screen. For example, the image indicating the area 510 may include an image displayed on the screen of the display 220 based on the second FoV.

According to an embodiment, the electronic device 101 may receive an input indicating that visual object 511 is selected. For example, the input indicating that the visual object 511 is selected may include a gesture of pressing the visual object 511, a gesture of touching the visual object 511 (e.g., a touch input), and/or an input for touching the visual object 511 with an external electronic device (e.g., a stylus pen). The electronic device 101 may crop the visual object 511 and display it on the screen based on receiving an input indicating that the visual object 511 is selected. For example, the electronic device 101 may receive an input indicating that the visual object 511 is selected while displaying a preview image including vertices A1, A2, A3, and A4 on the screen. Based on receiving an input indicating that the visual object 511 is selected, the electronic device 101 may display an image excluding the vertices A1, A2, A3, and A4 and including points X1, X2, X3, and X4. For example, the electronic device 101 may display an image indicating the area 510 on the screen of display 220 while obtaining an image indicating the area 520.

According to an embodiment, the electronic device 101 may perform image processing for the image when displaying an image indicating the area 510 on the screen. The image processing performed in the stable state may include an operation of recognizing a subject from the video 310 stored in the electronic device 101. The operation of recognizing the subject may include obtaining the position of the visual object corresponding to the subject in each of the frames in the video 310. For example, the image processing may include image resize and/or image improvement. For example, the image resize may include enlarging the image of the area 520. For example, the image improvement may include an operation to improve deterioration of image quality that may be occurred while enlarging the image of the area 520. For example, the image improvement may include contrast revision, gamma value revision, and/or noise removal.

According to an embodiment, the electronic device 101 may identify the position of the visual object 511 while displaying an image indicating the area 510. For example, the electronic device 101 may identify the position of visual object 511 within the area 520. For example, the position of the visual object 511 in the area 520 may be a position of the visual object 511 included in at least one grid among the grids in which the area 520 is divided. The electronic device 101 may store the position of the visual object 511 in a memory (e.g., the memory 130 of FIG. 3), as metadata (e.g., metadata 320 of FIG. 3). An example of the grid will be described later in FIG. 6.

According to an embodiment, the electronic device 101 may display a preview image based on the first FoV, while displaying the preview image based on the second FoV, in response to an input indicating that the visual object 511 is selected. For example, the electronic device 101 may display images obtained through the camera as preview images on the screen, based on an input indicating that the visual object 511 is selected while at least a part of the images obtained through the camera are displayed on the screen.

Referring to FIG. 5B, according to an embodiment, the electronic device 101 may display a preview image based on the second FoV. For example, the electronic device 101 may display a preview image based on the second FoV on the screen of the display 220, while obtaining the video of the first FoV based on the camera. While displaying the preview image based on the second FoV, the electronic device 101 may display a video obtained based on the first FoV on at least a part of the screen. For example, the electronic device 101 may display the video of the area 510 on the screen, while obtaining the video of the area 520 including the vertices A1, A2, A3, and A4 of FIG. 5A. For example, the video of area 510 may include a video obtained based on the second FoV included in the first FoV.

According to an embodiment, the electronic device 101 may display a visual object 530 indicating the area 520 while displaying the video of the area 510 on the screen. For example, the visual object 530 indicating area 520 may match a video including vertices A1, A2, A3, and A4 of FIG. 5A. For example, the electronic device 101 may receive an input for the visual object 530 indicating the area 520. The electronic device 101 may display a video indicating the area 520 on the screen based on receiving an input for the visual object 530.

According to an embodiment, the electronic device 101 may store information of a video displayed on the screen based on the first FoV and/or the second FoV, as metadata. The electronic device 101 may store an image based on the first FoV and load the metadata when reproducing the video based on the first FoV. While reproducing the video, the electronic device 101 may reproduce a video displayed on the screen based on the metadata.

As described above, according to an embodiment, the electronic device 101 may enhance the user experience by reproducing the video obtained based on the first FoV based on metadata. For example, the electronic device 101 may enhance the user experience of the electronic device 101 by maintaining the video obtained based on the first FoV and reproducing the video based on the second FoV.

Figure 6:
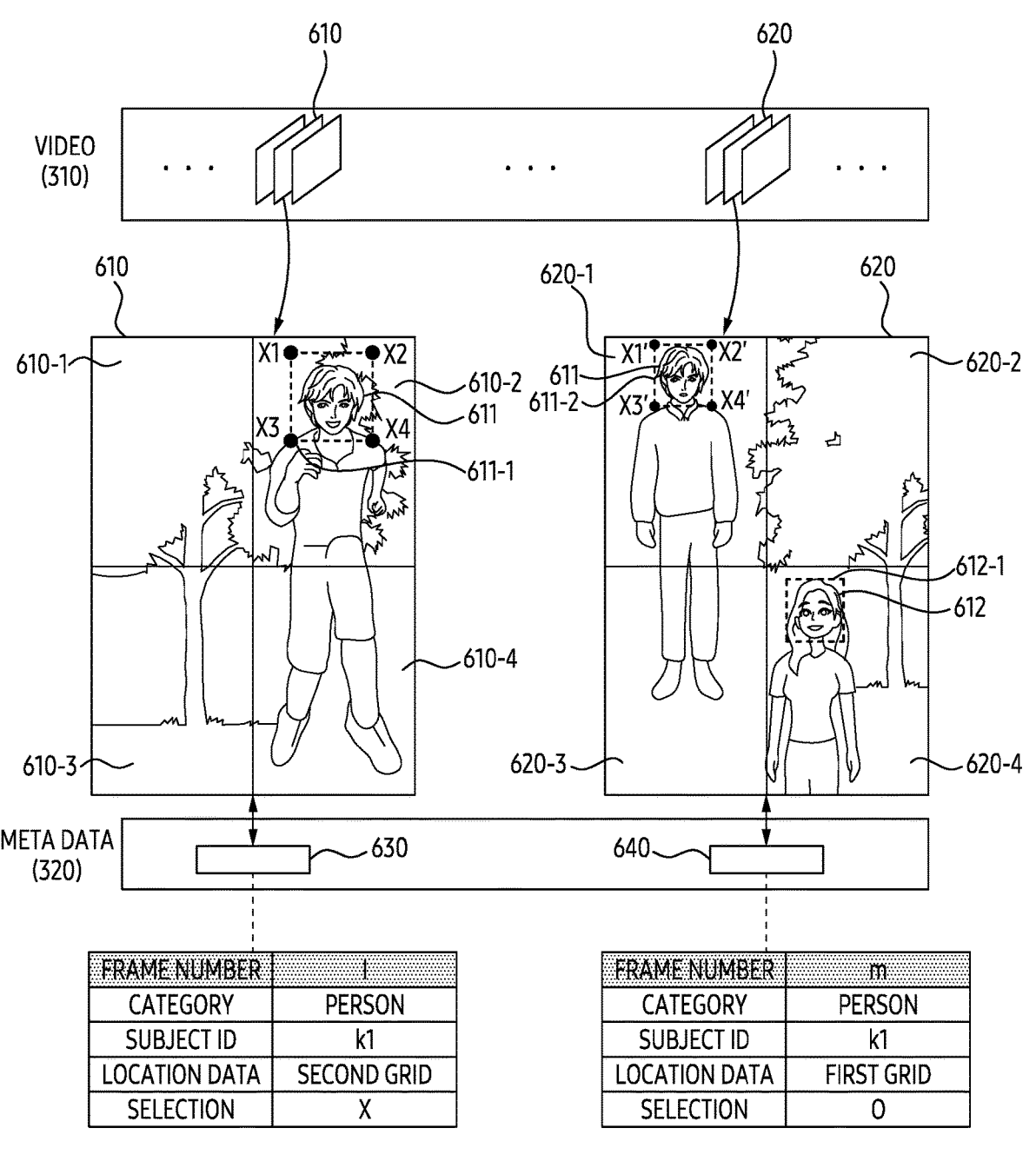
FIG. 6 is an example of information on frames included in a video, according to an embodiment.

FIG. 6 is an example of information on frames included in a video, according to an embodiment. A video 310 of FIG. 6 may be an example of the video 310 of FIG. 3. Metadata 320 of FIG. 6 may be an example of the metadata 320 of FIG. 3.

Referring to FIG. 6, according to an embodiment, the electronic device (e.g., the electronic device 101 of FIGS. 1 to 5B) may store the video 310 in a memory (e.g., the memory 130 of FIG. 3). The electronic device may store the metadata 320 in the memory. For example, the video 310 may include a plurality of frames. For example, the frames may include a frame number matching each of the frames. The video 310 may be sequentially displayed on the screen based on the frame number of each of the frames.

According to an embodiment, the electronic device may identify a visual object within frames included in the video 310. For example, the electronic device may identify a visual object 611 within a first frame 610. For example, the electronic device may identify at least a part of the visual object 611. For example, when the visual object 611 is a person, at least a part of the visual object 611 may be at least one of a person's whole body, a person's upper body, or a person's face.

According to an embodiment, the electronic device may assign an identifier to the visual object 611 based on identifying the visual object 611. For example, the electronic device may identify the area 611-1 based on identifying the visual object 611. For example, the area 611-1 may include at least a part of the visual object 611. For example, the area 611-1 may be an area for receiving an input indicating that the visual object 611 is selected. For example, the electronic device may identify the size of the area. According to an embodiment, the electronic device may identify a position of the visual object 611 within the first frame 610. For example, the first frame 610 may include a first grid 610-1, a second grid 610-2, a third grid 610-3 and/or a fourth grid 610-4. For example, the electronic device may identify that the visual object 611 is located within the second grid 610-2 based on identifying the visual object 611. The electronic device may store the number of the frame (e.g., the frame number 1 of FIG. 6) in which the visual object 611 is identified as information 630 of the metadata 320. For example, the electronic device may store a category (e.g., a person) of the visual object 611 as information 630 of the metadata 320. For example, the electronic device may store the identifier of the visual object 611 (e.g., subject ID(k1)) as information 630 of the metadata 320. For example, the electronic device may store whether the visual object 611 is selected by the user of the electronic device as information 630 of the metadata 320.

According to an embodiment, the electronic device may track the visual object 611. For example, the electronic device may identify the area 611-1 based on identifying the visual object 611 within the first frame 610. The electronic device may designate a coordinate value of the visual object 611 based on the points X1, X2, X3, and X4 of the area 611-1. The coordinate value of the visual object 611 may be an intersection of a line segment connecting point X1 and point X4 and a line segment connecting point X2 and point X3. The intersection of the line connecting the point X1 and the point X4 and the line connecting the point X2 and the point X3 may be referred to as a first intersection. For example, the electronic device may identify the visual object 611 within the second frame 620. The visual object 611 identified within the second frame 620 may have a coordinate value different from the visual object identified within the first frame 610. For example, the coordinate value of the visual object 611 within the second frame 620 may be an intersection of a line segment connecting the point X1' and the point X4' and a line segment connecting the point X2' and the point X3'. The intersection of the line segment connecting the point X1' and the point X4' and the line segment connecting the point X2' and the point X3' may be referred to as the second intersection. The electronic device may track the visual object 611 by identifying coordinate values of the first intersection and the second intersection.

According to an embodiment, the electronic device may include the second frame 620 different from the first frame 610 of the video 310. For example, the electronic device may identify the visual object 611 and/or the visual object 612 included in the second frame 620. The visual object 611 and/or the visual object 612 may be referred to as a subject. For example, the visual object 611 may be referred to as a first subject. The visual object 612 may be referred to as a second subject. For example, the electronic device may assign an identifier to each of a plurality of subjects based on the identification of a plurality of subjects. For example, the electronic device may assign a first identifier to the first subject. For example, the electronic device may assign a second identifier to the second subject.

According to an embodiment, the electronic device may identify and track the first subject. For example, the electronic device may identify the first subject within a plurality of frames. The electronic device may assign a first identifier to the first subject based on identifying the first subject. For example, the electronic device may assign a first identifier to the first subject based on identifying the first subject within a plurality of frames.

According to an embodiment, the electronic device may obtain the metadata 320 based on assigning the identifiers. For example, the metadata 320 may include an identifier of the visual object 611. For example, the metadata 320 may include an identifier of the visual object 612.

For example, the metadata 320 may include the location of the visual object 611. For example, the electronic device may identify a position of the visual object 611 within the second frame 620. The position of the visual object 611 within the second frame 620 may be at least a part of the grids 620-1 to 620-4 obtained by dividing the second frame 620. For example, the electronic device may identify that the visual object 611 is included in the first grid 620-1. For example, the metadata 320 may include the location of the visual object 612. For example, the electronic device may identify a position of the visual object 612 within the second frame 620. The electronic device may identify that the visual object 612 is included in the fourth grid 620-4.

For example, the metadata 320 may include the size of the visual object 611. For example, the electronic device may identify the size of visual object 611. For example, the electronic device may identify the size of the area 611-2 indicating the visual object 611. For example, the metadata 320 may include the size of the visual object 612. For example, the electronic device may identify the size of visual object 612. For example, the electronic device may identify the size of the area 612-1 indicating the visual object 612.

For example, the electronic device may identify whether to select the visual object 611. The electronic device may obtain the metadata 320 including whether to select the visual object 611. For example, the electronic device may identify whether to select the visual object 612. The electronic device may obtain the metadata 320 including whether to select the visual object 612. The metadata 320 described above may be matched with each of the frames 610 and 620 in the form of information 630 and 640.

According to an embodiment, the electronic device may compare the information 630 and 640 included in the metadata 320. For example, the electronic device may compare the frame number of the video 310 being reproduced with the frame number of the information 630 and 640. For example, the electronic device may identify the validity of the information 630 and 640 based on the comparison. The validity may indicate that the information 630 and 640 included in the metadata 320 match the video 310. For example, the electronic device may identify whether the frame number included in the metadata 320 is equal to the frame number included in the video 310. For example, the electronic device may identify whether the category of the subject included in the metadata 320 is equivalent to the category of the visual object identified in the video 310. For example, the electronic device may identify whether the subject identifier included in the metadata 320 is equivalent to the identifier assigned to the visual object identified in the video 310. For example, the electronic device may identify whether the location data of the subject included in the metadata 320 is equivalent to the location data of the visual object identified within the video 310. For example, the electronic device may identify whether the size information of the subject included in the metadata 320 is equivalent to the size information of the visual object identified in the video 310. For example, the electronic device may identify whether the selection by the user of the subject included in the metadata 320 is equivalent to the selection by the user of the visual object identified in the video 310. For example, the electronic device may identify whether at least one of the frame number, category, subject identifier, location data, or size of the subject included in the metadata 320 is equivalent to at least one of the frame number, the identifier of the visual object, the location of the visual object, or the size of the visual object included in the video 310. For example, when the information 630 and 640 does not match the video 310, the information 630 and 640 may be incorrect information. The electronic device may update the metadata 320 based on identifying incorrect information. Updating the metadata 320 may include reassigning the identifiers of the visual objects 611 and 612 included in the video 310 or identifying the locations of the visual objects 611 and 612.

As described above, according to an embodiment, the electronic device may display a stable image on the screen when the video 310 is reproduced, by identifying validity by comparing data between the metadata 320 and the video 310. For example, when at least one of the visual objects 611 and 612 is zoomed in and displayed on the screen, the electronic device may stably move the screen. The electronic device may enhance the user experience of the electronic device by stably moving the screen.

Figure 7:
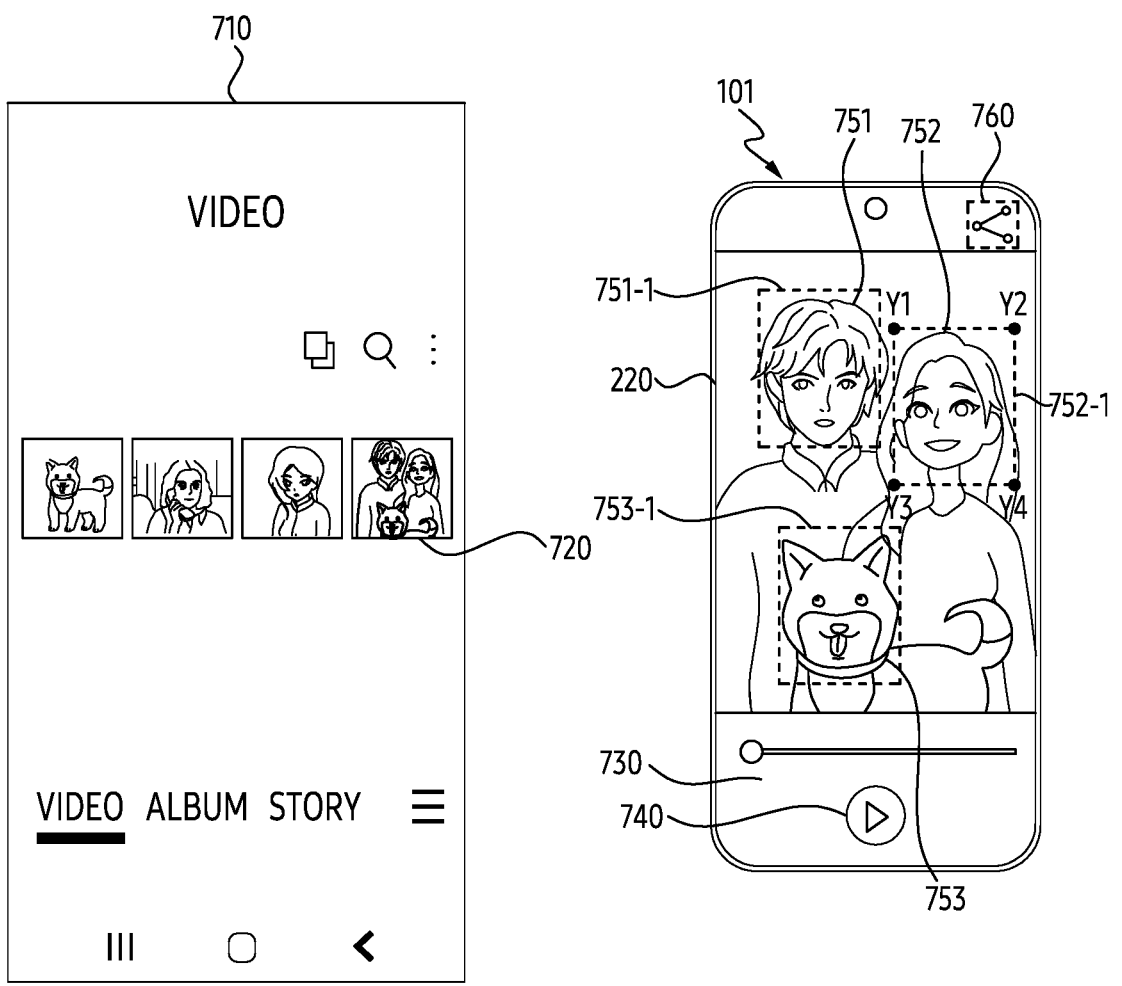
FIG. 7 is an example of an electronic device for reproducing a video, according to an embodiment.

FIG. 7 is an example of an electronic device for reproducing a video, according to an embodiment. The electronic device 101 of FIG. 7 may be an example of the electronic device 101 of FIGS. 1 to 5B. The display 220 of FIG. 7 may be an example of the display 220 of FIGS. 2 to 5B.

Referring to FIG. 7, according to an embodiment, the electronic device 101 may display a screen 710. The screen 710 may indicate a video (e.g., the video 310 of FIG. 3) stored in a memory (e.g., the memory 130 of FIG. 3) of the electronic device 101. For example, the electronic device 101 may display a first object 720 indicating a video. For example, the electronic device 101 may receive an input for the first object 720. The electronic device 101 may execute a video matching the first object 720 based on receiving an input for the first object 720. When executing the video, the electronic device 101 may load metadata matching the video. The electronic device 101 may execute the video based on the metadata. For example, the electronic device 101 may execute a video based on information included in the metadata. The electronic device 101 may reproduce the video based on information displayed on a screen by enlarging the visual object and/or information displayed on a screen corresponding to the location of the visual object.

According to an embodiment, the electronic device 101 may display the screen 730 based on executing a video matching the first object 720. For example, the screen 730 may include a second object 740 and/or a third object 760. For example, the second object 740 may include a button for reproducing the video. For example, the third object 760 may include a button for sharing the video to an external electronic device. The electronic device may transmit the video and the metadata when sharing the video to an external electronic device. For example, the electronic device may support to display a screen displayed on the electronic device when reproducing the video in an external electronic device, by transmitting the video and the metadata.

According to an embodiment, the electronic device 101 may receive an input for the second object 740. For example, the electronic device 101 may reproduce a video based on receiving the input for the second object 740. For example, the electronic device 101 may identify visual objects included in the video while reproducing the video. The electronic device 101 may display areas 751-1, 752-1, and 753-1 indicating that the visual objects 751, 752, and 753 are identified based on identification of the visual objects 751, 752, and 753. The electronic device 101 may receive an input indicating that at least one of the visual objects 751, 752, 753 and/or areas 751-1, 752-1, and 753-1 is selected. The electronic device 101 may display a screen corresponding to the input based on the input. For example, the electronic device 101 may display the area 752-1 on the screen based on an input to the visual object 752. For example, the vertices of an area in which the video is reproduced within the display 220 may match each of points Y1, Y2, Y3, and Y4 of the area 752-2.

As described above, according to an embodiment, the electronic device 101 may enhance the user experience of the electronic device 101 by transmitting the metadata together when sharing the video to an external electronic device.

Figure 8:
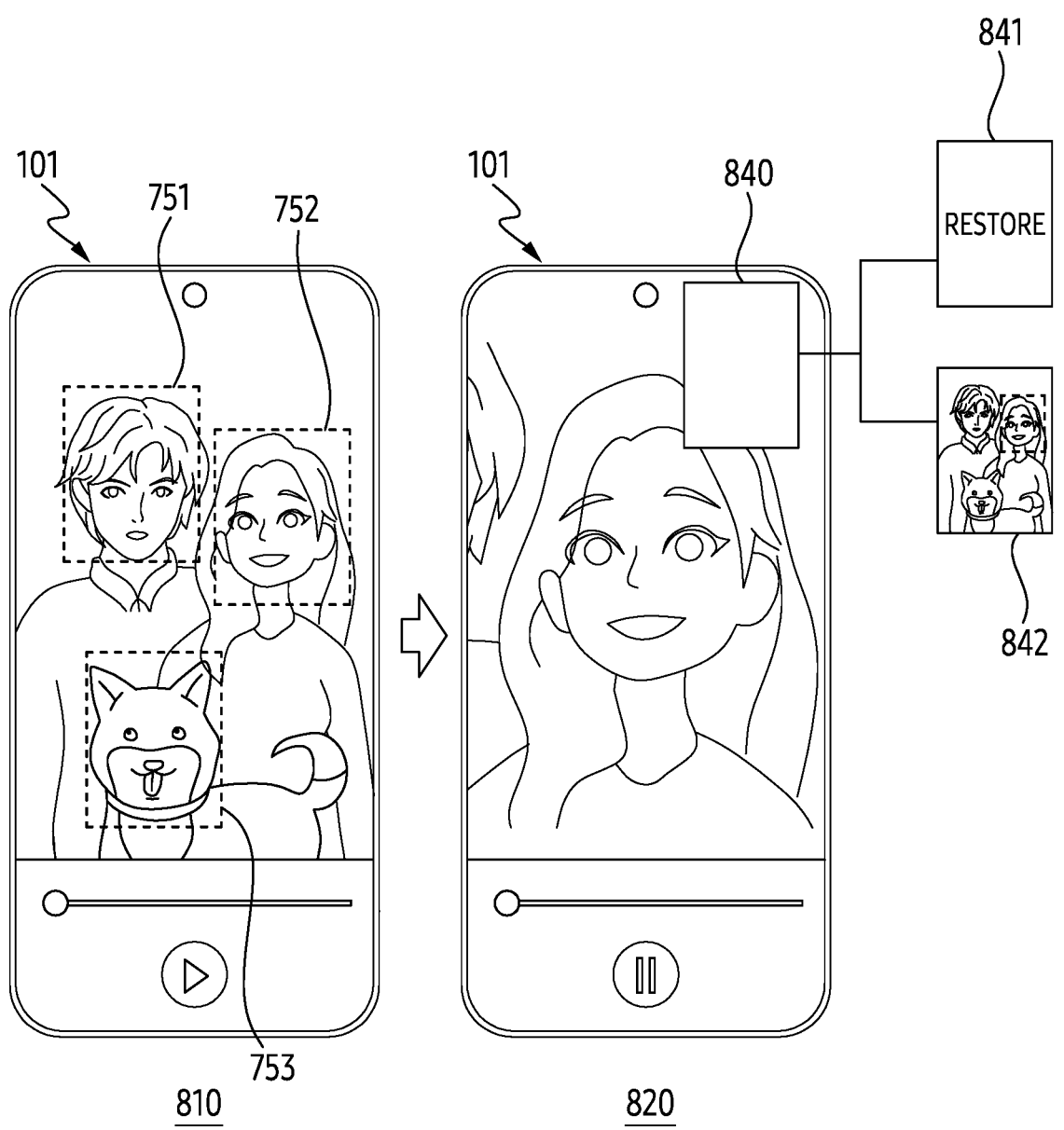
FIG. 8 is an example of an electronic device for reproducing a video, according to an embodiment.

FIG. 8 is an example of an electronic device for reproducing a video, according to an embodiment. The electronic device 101 of FIG. 8 may be an example of the electronic device 101 of FIGS. 1 to 5B and/or the electronic device 101 of FIG. 7. The display 220 of FIG. 8 may be an example of the display 220 of FIGS. 2 to 5B and/or the display 220 of FIG. 7.

Referring to FIG. 8, according to an embodiment, in a first example 810, the electronic device 101 may reproduce a video (e.g., the video 310 of FIG. 3). For example, the electronic device 101 may reproduce the video based on metadata (e.g., the metadata of FIG. 3). For example, the metadata may include information identifying visual objects 751, 752, and 753. For example, the metadata may include location information of the visual objects 751, 752, and 753. For example, the video may include a video obtained based on the first FoV.

According to an embodiment, the electronic device 101 may receive an input indicating that at least one of the visual objects 751, 752, and 753 is selected while reproducing a video of the first FoV. The electronic device 101 may enlarge and display the selected visual object in the screen based on an input indicating that at least one of the visual objects 751, 752, and 753 is selected. For example, the electronic device 101 may reproduce a video of the second FoV based on an input indicating that the visual object 752 is selected. For example, the video of the second FoV may include enlarging the selected visual object 752 and displaying it on the screen.

According to an embodiment, in a second example 820, the electronic device 101 may include a button for displaying a video in at least a part 840 of the screen displayed on the display 220 based on the first FoV, while displaying the video based on the second FoV. For example, the electronic device 101 may display a restore button 841 for displaying a video based on the first FoV on the part 840. For example, the electronic device 101 may display a button 842 indicating a video based on the first FoV on the part 840. The electronic device 101 may receive an input for at least one of the buttons 841 and 842. The electronic device 101 may display the video based on the first FoV based on an input for at least one of the buttons 841 and 842.

According to an embodiment, the electronic device 101 may store metadata obtained while the video is reproduced. For example, the electronic device 101 may obtain the metadata reproduced based on the first FoV while the video is reproduced based on the first FoV. For example, the electronic device 101 may obtain metadata reproduced based on the second FoV while the video is reproduced based on the second FoV. The electronic device 101 may reproduce the video based on the metadata. The electronic device 101 may display a screen having a FoV corresponding to the metadata while reproducing the video.

As described above, according to an embodiment, the electronic device 101 may obtain metadata while reproducing a video. The electronic device 101 may display a screen based on the metadata obtained while reproducing the video. The electronic device 101 may enhance the user experience of the electronic device by displaying the video on the screen based on the metadata.

Figure 9:
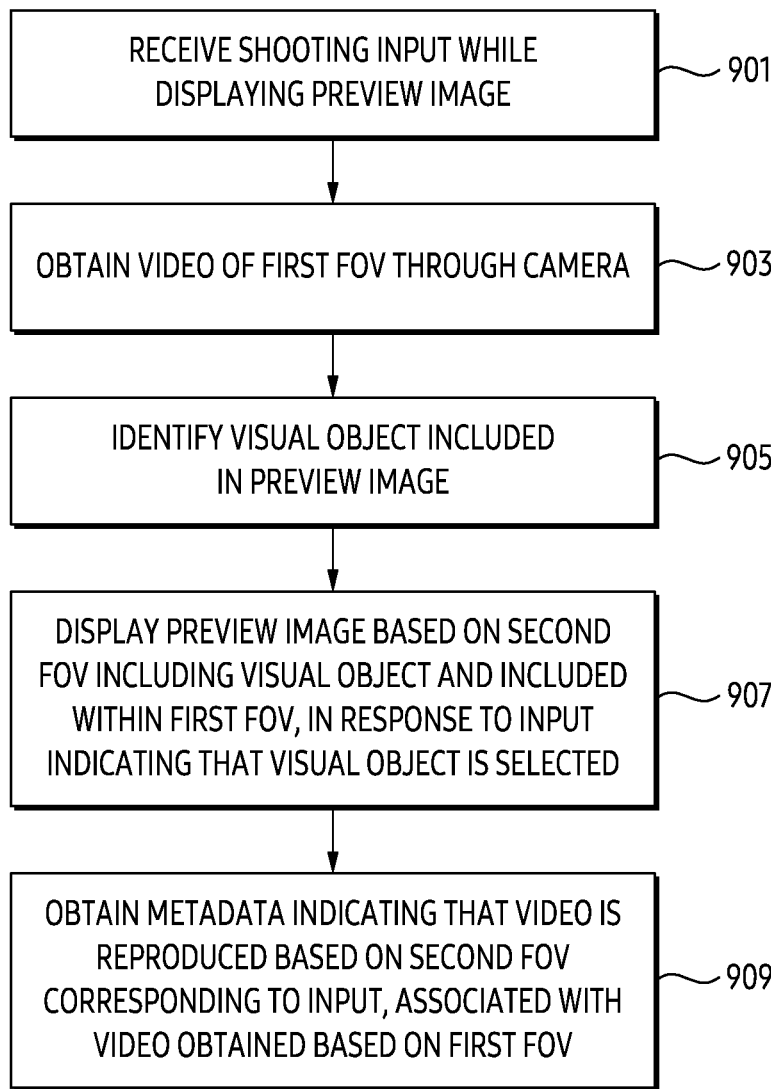
FIG. 9 is an example of a flowchart of an operation of an electronic device according to an embodiment.

FIG. 9 is an example of a flowchart of an operation of an electronic device according to an embodiment.

Referring to FIG. 9, in operation 901, according to an embodiment, an electronic device (e.g., the electronic device 101 of FIG. 3 and the processor 120 of FIG. 3) may receive a shooting input while displaying the preview image. For example, the electronic device may obtain images through a camera having a first FoV. While obtaining images through the camera having the first FoV, the electronic device may display a preview image based on at least a part of the images in the screen of the display. The electronic device may receive a shooting input while displaying the preview image.

In operation 903, according to an embodiment, the electronic device may obtain a video based on receiving a shooting input. For example, the electronic device may obtain the video of the first FoV through the camera in response to the shooting input. For example, the electronic device may display a preview image based on the first FoV while the video is obtained.

In operation 905, according to an embodiment, the electronic device may identify a visual object included in the preview image. For example, the electronic device may identify a visual object included in the preview image while obtaining the video.

In operation 907, according to an embodiment, the electronic device may receive an input indicating that the visual object is selected based on identifying the visual object. The electronic device may display a preview image based on the second FoV, in response to an input indicating that the visual object is selected. For example, the second FoV may be included in the first FoV. For example, in response to an input indicating that the visual object is selected, the electronic device may display a preview image on the screen based on the second FoV including the visual object and included within the first FoV.

In operation 909, according to an embodiment, the electronic device may obtain metadata while displaying the preview image on the screen. For example, the electronic device may display the preview image based on the first FoV and obtain metadata while obtaining the video. For example, the electronic device may obtain the metadata indicating that the video is reproduced based on the second FoV corresponding to the input among the first FoV and the second FoV, associated with the video obtained based on the first FoV.

According to an embodiment, the electronic device may reproduce the video based on obtaining the metadata and the video. While reproducing the video, the electronic device may display a screen of the FoV corresponding to the metadata.

As described above, according to an embodiment, while obtaining a video based on a camera having a first FoV, the electronic device may obtain the metadata based on the second FoV included in the first FoV. The electronic device may enhance the user experience of the electronic device by obtaining a video based on the metadata together with the metadata.

FIG. 10 is an example of a flowchart of an operation of an electronic device according to an embodiment.

Referring to FIG. 10, in operation 1001, according to an embodiment, the electronic device (e.g., the electronic device 101 of FIG. 3 and the processor 120 of FIG. 3) may reproduce a video stored in the memory (e.g., the memory 130 of FIG. 3). For example, the electronic device may obtain a video through a camera having the first FoV. For example, the electronic device may reproduce the video obtained through a camera having the first FoV.

In operation 1003, according to an embodiment, the electronic device may identify a visual object included in the video. The electronic device may receive an input indicating that the visual object is selected based on identifying the visual object. According to an embodiment, the electronic device may receive an input to an area corresponding to the visual object.

In operation 1005, according to an embodiment, the electronic device may display a video based on the second FoV. For example, the electronic device may display a video based on the second FoV, in response to the input indicating that a visual object is selected. For example, in response to the input indicating that the visual object is selected, the electronic device may display a video based on the second FoV including the visual object and included in the first FoV.

In operation 1007, according to an embodiment, the electronic device may obtain the metadata indicating that the video is reproduced based on the second FoV. For example, the electronic device may obtain the metadata indicating that the video is reproduced based on the second FoV corresponding to the input, associated with the video stored based on the first FoV. The electronic device may store the metadata in a memory.

As described above, according to an embodiment, the electronic device may obtain metadata while reproducing a video. The electronic device may reproduce a video having a FoV corresponding to the meta data while reproducing the video based on obtaining the meta data. The electronic device may enhance the user experience of the electronic device by reproducing a video having a FoV corresponding to the meta data.

As described above, according to an embodiment, an electronic device (e.g., the electronic device 101 of FIGS. 1 to 5B, and/or the electronic device 101 of FIGS. 8 to 9) may include a display (e.g., the display 220 of FIGS. 2 to 5B, and/or the display 220 of FIGS. 8 to 9), a camera (e.g., the camera 210 of FIG. 3), and a processor (e.g., the processor 120 of FIG. 1 and/or the processor 120 of FIG. 3). The processor may receive a shooting input while displaying a preview image based on at least a portion of images obtained through the camera having a first field-of-view (FoV). The processor may obtain a video (e.g., the video 310 of FIG. 3) of the first FoV through the camera, in response to the shooting input. The processor may identify a visual object included in the preview image, while obtaining the video. The processor may display the preview image, based on a second FoV that includes the visual object, and is included in the first FoV, in response to an input indicating selection of the visual object. The processor may obtain meta data (e.g., the metadata 320 of FIG. 3) indicating reproduction of the video based on the second FoV corresponding to the input, among the first FoV and the second FoV, where the meta data is associated with the video obtained based on the first FoV.

As described above, according to an embodiment, while obtaining a video based on a camera having the first FoV, the electronic device may obtain metadata based on the second FoV included in the first FoV. The electronic device may enhance the user experience of the electronic device by obtaining a video based on the metadata together with the metadata.

According to an embodiment, the processor may obtain the meta data including at least one of an identifier assigned to the visual object, a position, or a size of the second FoV in the first FoV.

According to an embodiment, the processor obtain the meta data based on a first identifier assigned to a first subject corresponding to the visual object selected by the input, among identifiers mapped to each of a plurality of subjects identified from images obtained through the camera.

According to an embodiment, the camera is a first camera, and the electronic device may further include a second camera different from the first camera. The processor may obtain another video including the visual object that is selected by the input, and is obtained by using the second camera, and based on the second FoV, in a state of obtaining the video based on the first FoV using the first camera based on the input.

According to an embodiment, the electronic device may include a memory. The processor may store the meta data indicating reproduction of the video based on the second FoV, in the memory.

According to an embodiment, the processor may identify whether the meta data stored in the memory is equivalent to information included in the video.

According to an embodiment, the processor may update the meta data based on identifying that the meta data is different from the information included the video.

According to an embodiment, the processor may display the video obtained based on the first FoV, in at least a portion of a screen displayed in the display, while displaying the preview image based on the second FoV.

According to an embodiment, the processor may display a button for displaying the preview image based on the first FoV, in at least a portion of a screen displayed in the display, while displaying the preview image based on the second FoV. The processor may display the preview image based on the first FoV, based on an input to the button.

According to an embodiment, the processor may display an area for indicating that the visual object is selected, based on the input indicating selection of the visual object, in a screen of the display.

As described above, according to an embodiment, an electronic device (e.g., the electronic device 101 of FIGS. 1 to 5B, and/or the electronic device 101 of FIGS. 7 to 8) may include a display (e.g., the display 220 of FIGS. 2 to 5B, and/or display 220 of FIGS. 7 to 8), a camera (e.g., the camera 210 of FIG. 3), a memory (e.g., the memory 130 of FIGS. 1 to 2), and a processor (e.g., the processor 120 of FIGS. 1 to 2). The processor may reproduce a video stored in the memory, obtained through the camera having a first field-of view (FoV). The processor may identify a visual object included in the video, while reproducing the video. The processor may display the video 310, based on a second FoV that includes the visual object and is included in the first FoV, in response to an input indicating selection of the visual object. The processor may obtain meta data (e.g., the metadata 320 of FIG. 3) indicating reproduction of the video based on the second FoV corresponding to the input, among the first FoV and the second FoV, wherein the meta data is associated with the video stored based on the first FoV.

As described above, according to an embodiment, the electronic device may obtain metadata while reproducing a video. The electronic device may reproduce a video having a FoV corresponding to the metadata while reproducing the video based on obtaining the metadata. The electronic device may enhance the user experience of the electronic device by reproducing a video having a FoV corresponding to the metadata.

According to an embodiment, the processor may obtain the meta data including at least one of an identifier assigned to the visual object, a position, or a size of the second FoV in the first FoV.

According to an embodiment, the processor may obtain the meta data, based on a first identifier assigned to a first subject corresponding to the visual object selected by the input, among identifiers mapped to each of a plurality of subjects identified in the video.

According to an embodiment, the processor may display the video based on the first FoV on at least a portion of a screen displayed in the display, while reproducing the video based on the second FoV.

According to an embodiment, the processor 120 may store the meta data indicating reproduction of the video based on the second FoV, in the memory.

According to an embodiment, the processor may display an area for indicating that the visual object is selected in a screen of the display based on the input indicating selection of the visual object.

According to an embodiment, the processor may identify whether first information included in the meta data is equivalent to second information identified in the video.

According to an embodiment, the processor may change the first information to the second information, based on identifying that the first information is different from the second information.

As described above, according to an embodiment, a method of an electronic device (e.g., the electronic device 101 of FIGS. 1 to 5B, and/or the electronic device 101 of FIGS. 7 to 8) may include receiving a shooting input, while displaying a preview image based on at least a portion of images obtained through the camera (e.g., the camera 210 of FIGS. 2 to 3) having a first field-of-view (FoV). The method of the electronic device may include obtaining a video (e.g., the video 310 of FIG. 3) of the first FoV through the camera, in response to the shooting input. The method of the electronic device may include identifying a visual object included in the preview image, while obtaining the video. The method of the electronic device may include displaying the preview image, based on a second FoV that includes the visual object, and is included in the first FoV, in response to an input indicating selection of the visual object. The method of the electronic device may include obtaining meta data (e.g., metadata 320 of FIG. 3) indicating reproduction of the video based on the second FoV corresponding to the input, among the first FoV and the second FoV, where the meta data 320 is associated with the video obtained based on the first FoV.

As described above, according to an embodiment, the electronic device may obtain the metadata based on the second FoV included in the first FoV, while obtaining a video based on a camera having the first FoV. The electronic device may enhance the user experience of the electronic device by obtaining a video based on the metadata together with the metadata.

According to an embodiment, the method of the electronic device may include obtaining the meta data including at least one of an identifier assigned to the visual object, a position, or a size of the second FoV in the first FoV.

According to an embodiment, the method of the electronic device may include obtaining the meta data based on a first identifier assigned to a first subject corresponding to the visual object selected by the input, among identifiers mapped to each of a plurality of subjects identified from images obtained through the camera.

According to an embodiment, the method of the electronic device may include obtaining another video including the visual object that is selected by the input, and is obtained by using the second camera, and based on the second FoV different from the first FoV, in a state of obtaining the video based on the first FoV using the first camera based on the input, based on the second camera different from the first camera.

According to an embodiment, the method of the electronic device may include storing the meta data indicating reproduction of the video based on the second FoV, in the memory.

According to an embodiment, the method of the electronic device may include displaying the video obtained based on the first FoV, in at least a portion of a screen displayed in the display, while displaying the preview image based on the second FoV.

According to an embodiment, the method of the electronic device may include displaying a button for displaying the preview image based on the first FoV, in at least a portion of a screen displayed in the display, while displaying the preview image based on the second FoV. The method of the electronic device may include display the preview image based on the first FoV, based on an input to the button.

According to an embodiment, the method of the electronic device may include displaying an area for indicating that the visual object is selected, based on the input indicating selection of the visual object, in a screen of the display.

As described above, according to an embodiment, a method of an electronic device (e.g., the electronic device

101 of FIGS. 1 to 5B, and/or the electronic device 101 of FIGS. 7 to 8) may include reproducing a video (e.g., the video 310 of FIG. 3) stored in the memory (e.g., the memory 130 of FIG. 3), obtained through the camera (e.g., the camera 210 of FIGS. 2 to 3) having a first field-of view (FoV). The method of the electronic device may include identifying a visual object included in the video, while reproducing the video. The method of the electronic device may include displaying the video, based on a second FoV that includes the visual object and is included in the first FoV, in response to an input indicating selection of the visual object. The method of the electronic device may include obtaining meta data indicating reproduction of the video based on the second FoV corresponding to the input, among the first FoV and the second FoV, where the meta data is associated with the video stored based on the first FoV.

As described above, according to an embodiment, the electronic device may obtain metadata while reproducing a video. The electronic device may reproduce a video having a FoV corresponding to the meta data while reproducing the video based on obtaining the meta data. The electronic device may enhance the user experience of the electronic device by reproducing a video having a FoV corresponding to the meta data.

According to an embodiment, the method of the electronic device may include obtaining the meta data including at least one of an identifier assigned to the visual object, a position, or a size of the second FoV in the first FoV.

According to an embodiment, the method of the electronic device may include obtaining the meta data, based on a first identifier assigned to a first subject corresponding to the visual object selected by the input, among identifiers mapped to each of a plurality of subjects identified in the video.

According to an embodiment, the method of the electronic device may include displaying the video based on the first FoV on at least a portion of a screen displayed in the display, while reproducing the video based on the second FoV.

According to an embodiment, the method of the electronic device may include storing the meta data indicating reproduction of the video based on the second FoV, in the memory.

According to an embodiment, the method of the electronic device may include displaying an area for indicating that the visual object is selected in a screen of the display based on the input indicating selection of the visual object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
at least one camera;
at least one processor comprising processing circuitry; and
memory comprising one or more storage media storing instructions that, when executed by the at least one processor individually or collectively, cause the electronic device to:
while a video is obtained via the at least one camera,
display, via the display, a first preview image corresponding to the video being obtained;
based on a first input with respect to a visual object included in the first preview image,
display, via the display, a second preview image that includes a portion of the first preview image including the visual object that is magnified; and
based on a second input storing the video:
generate metadata usable for displaying a scene corresponding to the second preview image using the video; and
store, in the memory, the video and the metadata as associated with each other.

2. The electronic device of claim 1, wherein the instructions, when executed by the at least one processor individually or collectively, cause the electronic device to:
based on a third input for reproducing the stored video being received, display, via the display, the scene corresponding to the second preview image by magnifying the video reproduced in accordance with the third input using the metadata; and
based on a fourth input for restoring the magnified video being received while the scene is displayed, cease displaying the scene and display another scene corresponding to the first preview image using the video.

3. The electronic device of claim 1, wherein the instructions, when executed by the at least one processor individually or collectively, cause the electronic device to:
based on the second input storing the video, generate the meta-data including at least one of an identifier assigned to the visual object, a position of the portion within the first preview image, or a size of the portion.

4. The electronic device of claim 1, wherein the instructions, when executed by the at least one processor individually or collectively, cause the electronic device to:
while the video is obtained via the at least one camera, identify subjects corresponding visual objects included in image frames of the video;
assign identifiers to the subjects; and based on the second input storing the video, generate the metadata including an identifier assigned to a subject corresponding to the visual object from among the identifiers.

5. The electronic device of claim 1, wherein the instructions, when executed by the at least one processor individually or collectively, cause the electronic device to:
identify whether the metadata stored in the memory is equivalent to information, included in the video, associated with the visual object.

6. The electronic device of claim 5, wherein the instructions, when executed by the at least one processor individually or collectively, cause the electronic device to:
based on identifying that the metadata is different from the information, update the metadata.

7. The electronic device of claim 1, wherein the instructions, when executed by the at least one processor individually or collectively, cause the electronic device to:
while the second preview image is displayed, display, via the display, a third preview image which the first preview image is reduced, in at least a portion of the second preview image; and
based on a third input with respect to the third preview image, display the first preview image.

8. The electronic device of claim 1, wherein the instructions, when executed by the at least one processor individually or collectively, cause the electronic device to:
based on the first input with respect to the visual object included in the first preview image, display, via the display, an area for indicating that the visual object is selected in the first preview image.

9. An electronic device comprising:
a display;
at least one processor comprising processing circuitry; and
memory comprising one or more storage media storing instructions that, when executed by the at least one processor individually or collectively, cause the electronic device to:
receive a first input for reproducing a video stored in the memory,
based on the first input, display, via the display, a first scene including a visual object using the video;
while the first scene is displayed, receive a second input with respect to the visual object included in the first scene;
in response to the second input, based on magnifying a portion of the first scene including the visual object, display a second scene representing the portion of the first scene;
generate metadata usable for displaying the second scene using the video; and
store, in the memory, the metadata as associated with the video stored in the memory.

10. The electronic device of claim 9, wherein the instructions, when executed by the at least one processor individually or collectively, cause the electronic device to:
based on a third input for reproducing the stored video being received after storing the metadata, display, via the display, the second scene by magnifying the portion of the first scene including the visual object using the metadata; and
based on a fourth input for restoring the magnified portion of the first scene being received while the second scene is displayed, cease displaying the second scene and display the first scene using the video.

11. The electronic device of claim 9, wherein the instructions, when executed by the at least one processor individually or collectively, cause the electronic device to:
generate the metadata including at least one of an identifier assigned to the visual object, a position of the portion within the first scene, or a size of the portion.

12. The electronic device of claim 9, wherein the instructions, when executed by the at least one processor individually or collectively, cause the electronic device to:
identify subjects corresponding visual objects included in image frames of the stored video;
assign identifiers to the subjects; and
generate the metadata including an identifier assigned to a subject corresponding to the visual object from among the identifiers.

13. The electronic device of claim 9, wherein the instructions, when executed by the at least one processor individually or collectively, cause the electronic device to:
identify whether the metadata stored in the memory is equivalent to information, included in the video, associated with the visual object.

14. The electronic device of claim 13, wherein the instructions, when executed by the at least one processor individually or collectively, cause the electronic device to:
based on identifying that the metadata is different from the information, update the metadata.

15. The electronic device of claim 9, wherein the instructions, when executed by the at least one processor individually or collectively, cause the electronic device to:
while the second scene is displayed, display, via the display, a third scene which the first scene is reduced, in at least a portion of the second scene; and
based on the third input with respect to the third scene, display the first scene.

16. The electronic device of claim 9, wherein the instructions, when executed by the at least one processor individually or collectively, cause the electronic device to:
based on the second input with respect to the visual object included in the first scene, display, via the display, an area for indicating that the visual object is selected in the first scene.

17. A method performed by an electronic device including a display and at least one camera, the method comprising:
while a video is obtained via the at least one camera, displaying, via the display, a first preview image corresponding to the video being obtained;
based on a first input with respect to a visual object included in the first preview image, displaying, via the display, a second preview image that includes a portion of the first preview image including the visual object that is magnified; and
based on a second input storing the video:
generating metadata usable for displaying a scene corresponding to the second preview image using the video; and
storing, in the memory, the video and the metadata as associated with each other.

18. The method of claim 17, further comprising:
based on a third input for reproducing the stored video being received, displaying, via the display, the scene corresponding to the second preview image by magnifying the video reproduced in accordance with the third input using the metadata; and
based on a fourth input for restoring the magnified video being received while the scene is displayed, ceasing displaying the scene and displaying another scene corresponding to the first preview image using the video.

19. The method of claim 17, comprising:

based on the second input storing the video, generating the metadata including at least one of an identifier assigned to the visual object, a position of the portion within the first preview image, or a size of the portion.

20. The method of claim 17, comprising:

while the video is obtained via the at least one camera, identifying subjects corresponding visual objects included in image frames of the video;

assigning identifiers to the subjects; and based on the second input storing the video, generating the metadata including an identifier assigned to a subject corresponding to the visual object from among the identifiers.

* * * * *